G. L. DUDLEY.
TWO SPEED HUB.
APPLICATION FILED FEB. 11, 1914.

1,181,861.

Patented May 2, 1916.
2 SHEETS—SHEET 1.

Witnesses

Inventor
George L Dudley

G. L. DUDLEY.
TWO SPEED HUB.
APPLICATION FILED FEB. 11, 1914.

1,181,861.

Patented May 2, 1916.
2 SHEETS—SHEET 2.

Witnesses

Inventor
George L. Dudley

UNITED STATES PATENT OFFICE.

GEORGE L. DUDLEY, OF WASHINGTON, DISTRICT OF COLUMBIA.

TWO-SPEED HUB.

1,181,861.    Specification of Letters Patent.    Patented May 2, 1916.

Application filed February 11, 1914. Serial No. 818,138.

*To all whom it may concern:*

Be it known that I, GEORGE L. DUDLEY, a citizen of the United States, residing at Washington, in the District of Columbia, have invented certain new and useful Improvements in Two-Speed Hubs, of which the following is a specification.

This invention relates to two speed drive hubs for motorcycles and like vehicles.

It aims to augment and further protect my application filed on two speed hubs February 28th, 1913, Serial Number 751,346.

It further aims to show new refinements and details in two speed hub invention and construction.

The principal point of invention in this two speed hub is a split inner hub in two or more parts capable of lateral contraction, expansion and separation for the purposes of an equalization, or lateral adjustment, of both the inner and the outer hub bearings and the disassembling of the entire hub into its respective separate elements and re-assembling of the same by means of a single cone adjustment upon the axle of the said two speed hub. In order to further disclose my invention of a two speed inner hub capable of lateral adjustment, I have shown four modifications of the same in Figures 2, 3, 4 and 5 of the drawings.

Among the many further advantages of the split inner hub are strength, simplicity, compactness and beauty of outline.

As with the other models of two speed hubs of my invention, this two speed hub offers the four following functions in combination: a free wheel; low gear; high gear; and brake, all without the use of hollow axles, sliding dogs, sliding gears or other weak or noisy parts.

For a full understanding of the invention, reference is to be had to the following description and accompanying drawings, in which:—

Figure 1:
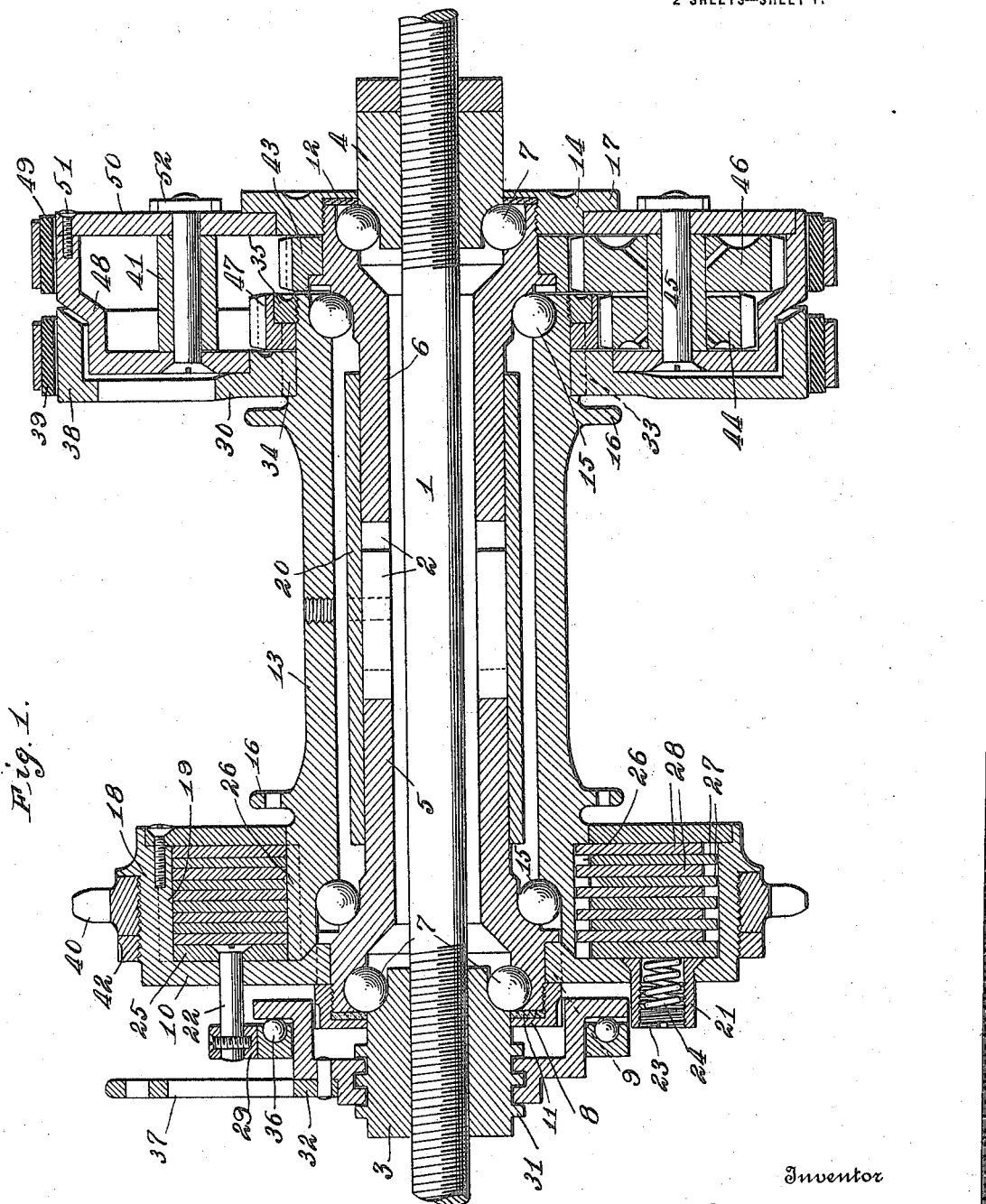

Fig. 1 is a longitudinal sectional view through the hub embodying the present invention, and Figs. 2, 3, 4 and 5 are four longitudinal sectional views of four of the many modifications of which the present invention is capable.

Corresponding parts are referred to in the following description and indicated in all the views of the accompanying drawings by the same reference characters.

In the drawings the numeral 1 indicates the hub axle, which, as is usual, is fixed in the forks of the frame of the vehicle. Threaded upon the axle 1 are the cones 3 and 4 upon which, by means of the ball bearings 7, are mounted for rotation the two parts 5 and 6 of the split inner hub. The inner ends of the inner hub parts 5 and 6 are provided with a plurality of laterally-projecting, alternating, overlapping fingers 2 which allow the inner hub to contract and expand laterally as may be necessary for the proper adjustment of its bearings 15 and its bearings 7 by means of either the cone 3 or the cone 4 or both said cones upon the said axle 1. It is apparent that the hub parts 5 and 6 rotate as a whole, as a solid hub would, at all times when assembled and performing their functions as described. The above described construction further provides means for disassembling the hub into its respective component parts by the removal of either the cone 3 or the cone 4, and further provides equal facility in assembling the component parts especially as regards assembling the bearings 15 and the inner hub within the outer hub. Snugly disposed about the inner hub parts 5 and 6 is the sleeve 20 whose sole function is to prevent distortion of the parts 5 and 6 of the inner hub.

In this application I do not wish to limit myself to a claim covering merely the form of split inner hub shown in Fig. 1 of the drawings, nor do I wish to limit myself to claims covering merely the modifications of the same as shown in Figs. 2, 3, 4 and 5, but I believe I am entitled to claims covering any form of two speed split inner hub designed to accomplish a like result as described.

The outer hub 13 is mounted for free rotation about the inner hub by means of the ball bearings 15. Upon the outer end of the inner hub part 5 is keyed upon castellated lugs 9 the head 10 which is further fixed in place by the combined lock nut and dust cap 8. A sprocket 40, geared by any means with the engine shaft, is threaded upon the lateral flange 18 which projects inwardly from the head 10, the sprocket 40 being locked in place by the lock ring 42. At this time it will be apparent that the inner hub is driven direct from the engine shaft at all times by means of the parts described. Integral with the flange 18 are a multiplicity of ribs 19 upon which are disposed for rotation therewith a multiplicity of friction clutch disks 27, these disks 27 being mounted for free lateral movement. Disposed alternately with the said disks 27 are a multiplicity of friction disks 28 mounted for rotation with the outer hub 13 by means of a multiplicity of ribs 26. A pressure disk 25 is disposed adjacent to the head 10 for the purpose of causing a frictional clutch between the disks 27 and the disks 28 by means of the tension of a multiplicity of pressure springs 24 retained by a nut 23 within a thimble 21 which projects laterally through the head 10 outwardly. A set of pull pins 22 is disposed in the pressure disk 25 and project laterally through the head 10. Upon the outer extremity of pins 22 is disposed a ring 29 secured by small screws, which carries a race of balls 36, which in turn bears against the control disk 32. The control disk is mounted upon a thread 31, which, when the said disk 32 is partially rotated either forwardly or rearwardly by means of the lever 37, imparts a lateral movement to the disk 32 for the purpose of controlling the frictional engagement of the friction disks 27 and 28 through the means of the pins 22 and the disks 25 described.

By the above it will be apparent that, since the thread 31 is a left hand thread, a forward pull on the lever 37 will give lateral movement to the control disk 32 and allow the springs 24 to exert their tension against the pressure disk 25 and thus clutch all disks 27 and 28 as a whole and cause a direct drive between the sprocket 40 and the outer hub 13, through the means described: This is termed high gear. It will further be apparent that a backward push upon the lever 37 will move the control disk laterally to the left, or outwardly, and cause the said control disk 32 to pull with it to the left the ring 29, the pins 22, and the disk 25, thus releasing all friction disks 27 and 28 of clutch with each other and allowing the gear 40 to drive the inner hub parts 5 and 6 free or idly without imparting movement to the outer hub, either with the vehicle traveling or stationary: This is termed a free wheel.

Mounted upon the outer end of the inner hub part 6 by means of castellated lugs is the gear 43 held in place against lateral movement by means of the combined lock nut, dust cap and gear box bearing cone 14. Meshing with the gear 43 are three or more pinions 44 and 46 shown integral. The said double pinions 44 and 46 are mounted for rotation about bronze bearing thimbles 41, which, in turn, are fixed upon bolts 45. The pinions 44 and 46 are thus mounted in a gear box 48 which is free to rotate about the hub. The gear box 48 is shown with a head plate 50 secured in place by the nuts 14 and the screws 51. Meshing with the pinions 44 is a large gear 47 which, together with a brake flange, or spider, 30, is secured on the outer hub 13 by means of the castellated lugs 33 and the locking ring 35. At the periphery of the braking flange 30 is formed a laterally projecting braking friction surface about which is disposed a contracting brake band of the common style and mode of operation. Although the gear box 48 is mounted for rotation by means of the multiplicity of double gears or pinions 44 and 46, a further bearing is found for the gear box 48 upon the brake flange 30 at its base 34, and a further bearing is also shown at the periphery of the lock nut 14 and the small flange 17 which projects radially from the lock nut 14. A low speed contracting control band 49 is disposed about the periphery of the gear box 48.

From the foregoing it will be apparent that, with the engine running idle, the inner hub 5 and 6 will rotate forwardly carrying with it the gear 43. If the outer hub 13 and the gear 47 are stationary, the action of the pinions 44 and 46 upon the gears 43 and 47 will force the gear box 48 to rotate rearwardly as a whole. However, upon the application and contraction of the low speed control band 49 about the periphery of the gear box 48, the gear box 48 will be held stationary against any rotative movement and the outer hub 13 will be driven forwardly at a reduced rate of speed by the action of the said gears: This is termed low gear. A contraction of the brake band 39 about the lateral flange 38 of the brake flange 30 will retard or arrest the rotative movement of the outer hub 13: This is termed braking.

Figure 2:
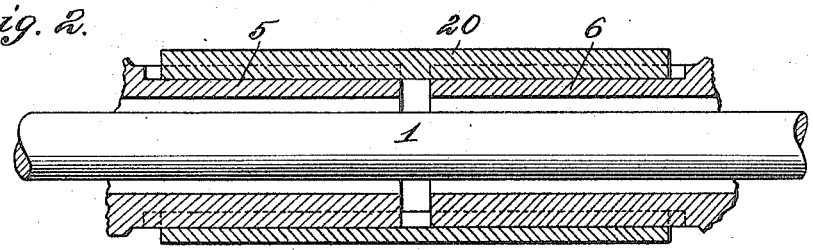

A modified form of the inner hub is shown in Fig. 2 wherein the inner hub parts 5 and 6 are caused to rotate jointly by a sleeve 20 which is formed with alternated slots and ribs running laterally to fit with companion slots and ribs found in the inner hub parts 5 and 6.

Figure 3:
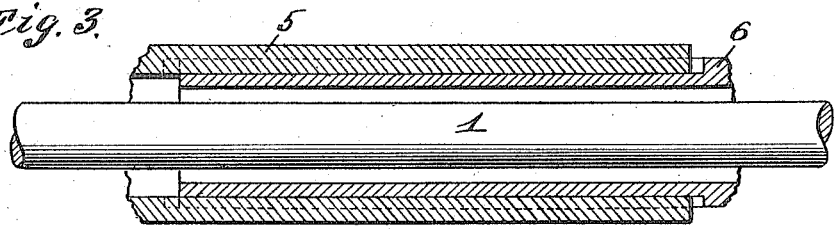

In the modified form shown in Fig. 3 the inner hub part 5 extends over and about the part 6 and is fitted with alternated slots and ribs coöperating with similar slots and ribs found upon the part 6.

Figure 4:
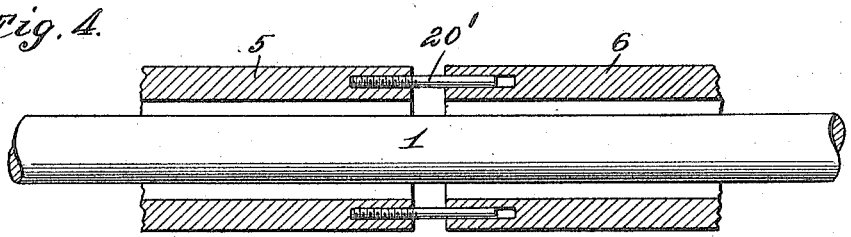

In the modified form shown in Fig. 4 the inner hub parts 5 and 6 are shown connected with a pin 20'.

Figure 5:
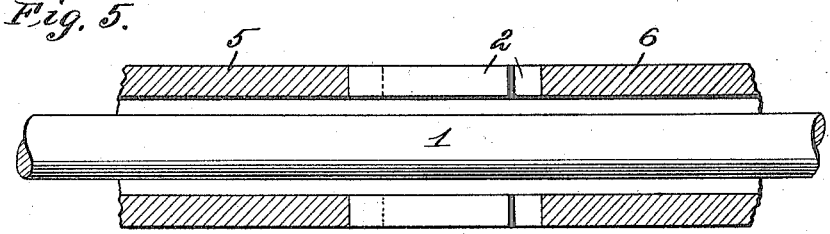

In the modified form shown in Fig. 5 the inner hub parts 5 and 6 are shown identical with the corresponding parts in Fig. 1 with the exception that the inner hub sleeve 20 is eliminated.

Having thus described my invention, what I claim as new is:—

1. In a device of the class described, an inner hub, an outer hub having bearing upon the inner hub, a spindle, bearing cones upon the spindle supporting the inner hub, and gear connections between the hubs, the inner hub comprising sections connected for rotation in unison and relatively longitudinally adjustable to provide for adjustment of said bearings.

2. In a device of the class described, inner and outer hubs, and change speed gearing connecting the hubs, the inner hub comprising sections connected for rotation in unison and relatively longitudinally adjustable.

3. In a device of the class described, an outer hub, an inner hub, two-speed gearing connecting the hubs, a spindle, bearing cones upon the spindle supporting the inner hub, the said inner hub comprising sections longitudinally separably connected and rotatable in unison.

4. In a device of the class described, inner and outer hubs, change speed gearing connecting the hubs, the inner hub comprising sections, means connecting the sections for rotation in unison, and means supporting the connected ends of the sections for relative longitudinal adjustment.

5. In a device of the class described, an inner hub, an outer hub, means for transmitting power to the inner hub, a brake member fixed upon the outer hub, a bearing member upon the inner hub, a gear casing rotatably supported by the said brake and bearing members, a system of planetary gearing between the inner and outer hubs within the said casing, and means for controlling the rotary movement of the casing.

6. In a device of the class described, an inner hub, an outer hub, means for transmitting power to the inner hub, a brake member fixed upon the outer hub, a gear casing rotatably supported by the said brake member and inner hub, a system of planetary gearing between the inner and outer hubs within the said casing, and means for controlling the rotary movement of the casing.

7. In a device of the class described, an inner hub, an outer hub, means for transmitting power to the inner hub, a brake member fixed upon the outer hub, a rotary gear casing, a system of planetary gearing between the inner and outer hubs housed within the said casing, and means for controlling the rotary movement of said casing.

In testimony whereof I affix my signature in presence of two witnesses.

GEORGE L. DUDLEY.

Witnesses:
H. A. ROBINETTE,
GERTRUDE M. STUCKER.

Copies of this patent may be obtained for five cents each, by addressing the "Commissioner of Patents, Washington, D. C."